No. 676,202. Patented June 11, 1901.
W. H. PERKINS.
INCANDESCENT LAMP SOCKET.
(Application filed Apr. 9, 1901.)
(No Model.)
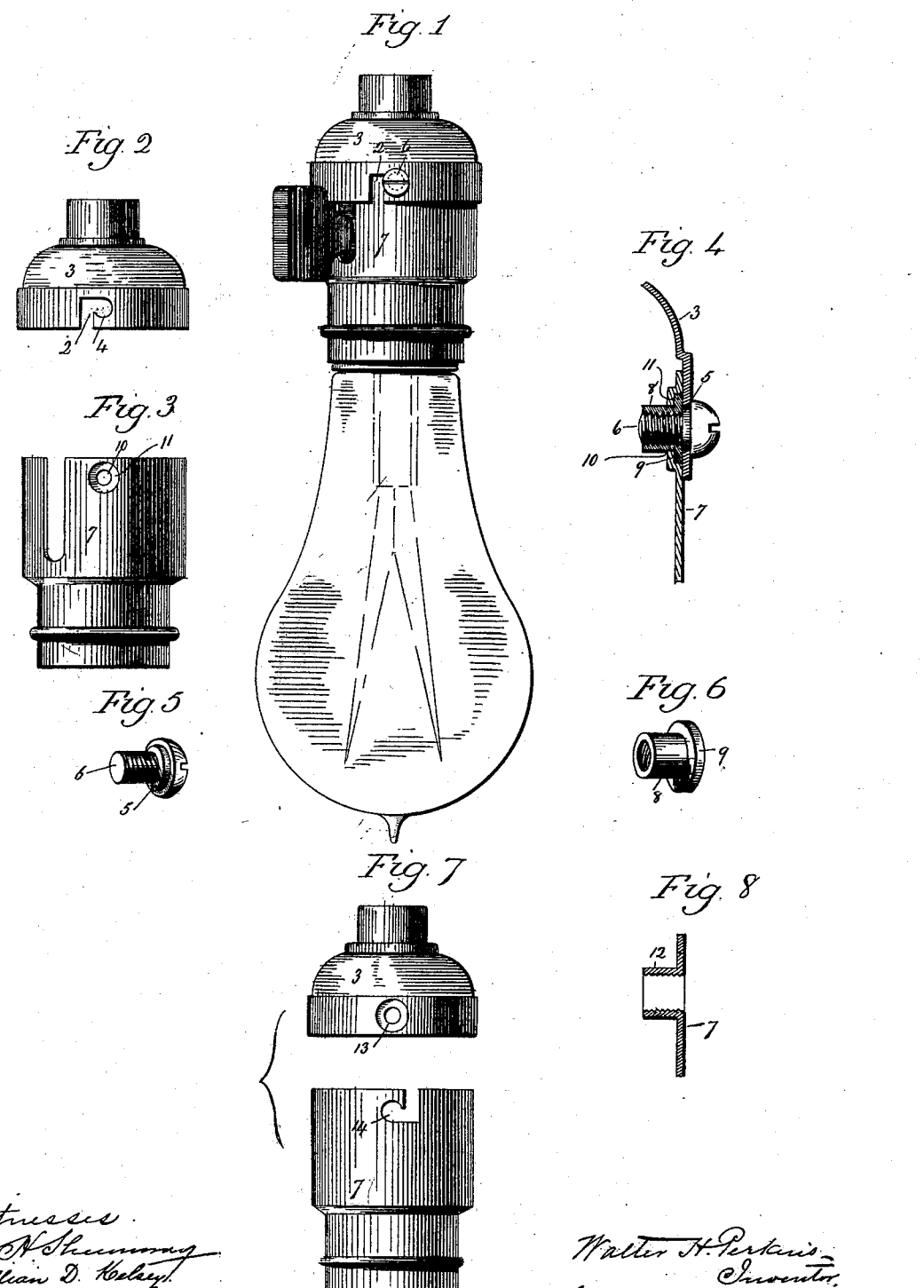

United States Patent Office.

WALTER H. PERKINS, OF WATERBURY, CONNECTICUT, ASSIGNOR TO THE WATERBURY MFG. CO., OF SAME PLACE.

INCANDESCENT-LAMP SOCKET.

SPECIFICATION forming part of Letters Patent No. 676,202, dated June 11, 1901.

Application filed April 9, 1901. Serial No. 55,068. (No model.)

*To all whom it may concern:*

Be it known that I, WALTER H. PERKINS, of Waterbury, in the county of New Haven and State of Connecticut, have invented a new Improvement in Incandescent-Lamp Sockets; and I do hereby declare the following, when taken in connection with the accompanying drawings and the numerals of reference marked thereon, to be a full, clear, and exact description of the same, and which said drawings constitute part of this specification, and represent, in—

Figure 1, a view in side elevation of one form which an incandescent-lamp socket provided with my invention may assume; Fig. 2, a detached view, in side elevation, of the sheet-metal cap thereof; Fig. 3, a corresponding view of the sheet-metal body thereof; Fig. 4, an enlarged view, in vertical section, showing the locking of the cap and body together by the entrance of a locking-shoulder formed upon the screw into a locking enlargement formed at the inner end of the inner leg of the bayonet-slot; Fig. 5, a detached perspective view of the screw; Fig. 6, a corresponding view of the flanged and tapped bushing therefor; Fig. 7, a view showing the cap and body in side elevation with the slot and bushings reversed in position; Fig. 8, a modified construction showing how the bushing may be dispensed with.

My invention relates to an improvement in incandescent-lamp sockets, the object being to improve, simplify, strengthen, and reduce the cost of such sockets, as well as to make them more convenient and reliable in use.

With these ends in view my invention consists in certain details of construction and combinations of parts, as will be hereinafter described, and pointed out in the claims.

In carrying out my invention as herein shown I form the inner end of the inner leg of the bayonet-slot 2 in the sheet-metal cap 3 of the socket with a circular locking enlargement 4 for the reception of a locking-shoulder 5, formed just under the head of the screw 6, mounted near the upper edge of the sheet-metal body 7 of the socket and designed to enter the said slot for locking the cap and body together. To enter the screw 6 into the slot 2, it is turned or set so that its shoulder 5 will clear; but after the said shoulder has been brought into registration with the locking enlargement 4 the screw is turned so as to enter the shoulder thereinto, whereby the screw locks the cap and body together, so that neither of the same can be turned until after the screw has been again turned out so as to disengage the shoulder 5 from the enlargement 4. For the reception of the screw I preferably employ a tapped bushing 8, having a flange 9 at its outer end. This bushing is set into a hole 10 formed in the body 7 and surrounded by a circular recess 11, produced by setting the metal inward around the hole 10 for a sufficient depth to receive the flange 9, the outer face of which will then be flush with the face of the body 7. In this way I form an ample bearing for the screw. I am not, however, obliged to use the flanged bushing 8, because, if preferred, the metal of the body 7 may be drifted in to form a socket or bearing 12, as shown in Fig. 8, and tapped, as also shown in the said figure, for the reception of the screw. Of course the coaction of the locking-shoulder 5 of the screw with the locking enlargement 4 of the bayonet-slot is not effected by the provision made for carrying the screw itself, and I do not limit myself to doing that in any one way. Instead of locating the bayonet-slot 2 in the cap and the screw in the body the said slot and screw may be reversed in location, as shown in Fig. 7, in which the cap 3 is shown as provided with a bushing 13 and the body 7 as formed with a bayonet-slot 14. It will be understood, of course, that every socket is provided with two bayonet-slots and two coupling-screws, but as they are duplications of each other it is sufficient to show and describe one herein. I would therefore have it understood that I do not limit myself to the exact construction herein shown and described, but hold myself at liberty to make such changes as fairly fall within the spirit and scope of my invention.

Having fully described my invention, what I claim as new, and desire to secure by Letters Patent, is—

1. In an incandescent-lamp socket, the combination with the cap and the body thereof, one of which is provided with a bayonet-slot having the inner end of its inner leg formed with a locking enlargement, and the other of which is formed with a socket for the reception of a screw; of a coupling-screw formed upon the inner face of its head with a locking-shoulder adapted to enter the said enlargement for locking the cap and body together.

2. In an incandescent-lamp socket, the combination with a cap and body, one of which is formed with a bayonet-slot, and the other of which is formed with a hole surrounded by a recess, of a flanged bushing set into the said recess and tapped, and a screw mounted in the said bushing and adapted to enter the said slot.

In testimony whereof I have signed this specification in the presence of two subscribing witnesses.

WALTER H. PERKINS.

Witnesses:
ADOLPH C. RECKER,
EDWARD H. MARSHALL.